(12) United States Patent
Heiman et al.

(10) Patent No.: US 6,171,419 B1
(45) Date of Patent: Jan. 9, 2001

(54) APPARATUS AND METHOD FOR FORMING AN INTERIOR PANEL FOR A VEHICLE

(75) Inventors: Thomas A. Heiman, Pickney; Gregory Hunter, Beverly Hills; Bernard Koester, Howell; Joseph Klun, Novi; Christopher J. Niehaus, Jackson; Michael K. Bonner, Roseville, all of MI (US)

(73) Assignee: Magna Interior Systems Inc., Aurora (CA)

(*) Notice: Under 35 U.S.C. 154(b), the term of this patent shall be extended for 0 days.

(21) Appl. No.: 09/097,596

(22) Filed: Jun. 16, 1998

Related U.S. Application Data (60) Provisional application No. 60/049,731, filed on Jun. 17, 1997.

(51) Int. Cl.[7] ............................. B29C 67/20; B32B 31/04; B32B 31/16
(52) U.S. Cl. ............................. 156/78; 156/212; 156/245; 156/285; 264/46.4; 264/46.8; 264/101; 264/257; 264/511; 264/553; 264/DIG. 65; 264/DIG. 78
(58) Field of Search ............................. 156/78, 79, 196, 156/212, 214, 245, 285; 264/46.4, 46.8, 101, 757, 511, 553, DIG. 65, DIG. 78

(56) References Cited

U.S. PATENT DOCUMENTS

| | | | |
|---|---|---|---|
| 3,654,012 | * | 4/1972 | Schlager ............................. 156/212 |
| 4,740,417 | * | 4/1988 | Tornero ............................. 428/308.4 |
| 4,838,973 | * | 6/1989 | Mentzer et al. ............................. 156/212 |
| 5,091,031 | | 2/1992 | Strapazzini . |
| 5,340,425 | | 8/1994 | Strapazzini . |
| 5,387,390 | | 2/1995 | Komylo . |
| 5,397,409 | | 3/1995 | Komylo . |
| 5,529,742 | | 6/1996 | Strapazzini . |
| 5,571,355 | | 11/1996 | Komylo . |

FOREIGN PATENT DOCUMENTS 61-162317  7/1996 (JP) .

* cited by examiner

Primary Examiner—Sam Chuan Yao
(74) Attorney, Agent, or Firm—Pillsbury Madison & Sutro, LLP (57) ABSTRACT

An apparatus for forming an interior panel for a vehicle door includes mandrels which hold rolls of vinyl laminate and fiberglass reinforcing mat and from which sheets of vinyl laminate and reinforcing mat are pulled in overlying relation with respect to each other. The vinyl and mat sheets are tacked together, cut to a predetermined length by a cutting mechanism, and moved into a heater by a pin-chain conveyor system. In the heater, the vinyl and mat are heated until the vinyl, which is supported at its edges by the pin-chain conveyor, sags a sufficient amount to indicate that the vinyl is sufficiently softened. The heated vinyl and mat are then moved to a vacuum mold part and thereafter a vacuum is applied to draw the vinyl to a molding surface of the vacuum mold part. A vacuum assist, carried on a carrier, engages the mat and heated vinyl within the vacuum mold part to press the mat into the heated vinyl to partially embed the mat into the vinyl to secure the mat to the vinyl. Thereafter, a foamable and curable urethane substrate material is poured into the formed vinyl and mat. A cooperating opposed mold part engages the vacuum mold part and applies heat and pressure to form the urethane substrate material and to cure th e substrate material into a relatively rigid substrate which is reinforced by the mat.

15 Claims, 6 Drawing Sheets

APPARATUS AND METHOD FOR FORMING AN INTERIOR PANEL FOR A VEHICLE

This application claims the benefit of prior filed provisional patent application Ser. No. 60/049,731, filed Jun. 17, 1997.

FIELD AND BACKGROUND OF THE INVENTION

The present invention relates to interior panels for automotive vehicle doors, and more particularly to improvements in apparatuses and techniques for forming interior panels by which the incidence of panel surface defects is minimized.

An interior panel for an automotive vehicle door typically includes an exterior layer, or skin, made from a smooth, imperforate material, such as vinyl film, backed by a relatively rigid substrate. The panel may be formed in a vacuum mold assembly, the exterior layer being vacuum-drawn in a heated state to the molding surface of a lower, or female, mold part. The molding surface defines the exterior, or A-side, surface of the panel. The substrate material is then applied to the back of the exterior layer, typically by adhering a rigid pre-formed substrate panel to the vacuum-formed exterior layer, or by pouring a foamable liquid onto the vacuum-molded exterior layer disposed in the lower vacuum mold part. A cooperating upper, or male, mold part, also known as a core, is engaged with the lower mold part to press the pre-formed substrate panel to the exterior layer or to form and cure the foamed material onto the back of the exterior layer. The upper mold part has a molding surface which defines the back, or B-side, surface of the panel. A reinforcing material in the form of a mat may be embedded into the substrate when it is pre-formed or when it is formed directly onto the back of the exterior layer to enhance the strength and durability of the substrate.

The exterior surface of the exterior layer may have embossments and/or surface texture formed therein by the molding surface of the lower mold part. In addition, the interior panel may include other features, such as an arm rest, door handle, openings for door release levers and accessories, such as door speakers and interior lights, and fabric or carpet bolsters attached to the exterior surface of the panel during or after the panel-forming process.

Various methods for forming an interior panel for a vehicle door are described in the prior art literature, and particular methods are described in U.S. Pat. Nos. 5,571,355; 5,397,409; and 5,387,390, the contents of which are hereby incorporated by reference.

In one process described in the previously-mentioned patents, a heated sheet of vinyl laminate material is laid in the lower mold part of a vacuum mold assembly. The vinyl laminate includes an outer layer comprised of a smooth, relatively imperforate vinyl sheet and a back layer of relatively soft foam material bonded to the back side thereof. A vacuum is applied at the molding surface of the lower mold part to draw the vinyl sheet to the molding surface. In a subsequent step of the panel-forming process, a fiberglass reinforcing mat is laid in the lower mold part on top of the vacuum-drawn vinyl layer. After vacuum-drawing the vinyl layer, a foamable material, such as a foamable polyurethane liquid, is poured into the lower mold part on top of the fiberglass reinforcing mat and the vacuum-drawn vinyl layer. A cooperating upper mold part, having a molding surface which defines the back of the panel, is moved into cooperating engagement with the lower mold part, with the vinyl layer, the fiberglass reinforcing mat, and foamable material disposed between the respective molding surfaces of the upper and lower mold parts. The foamable material is foamed and cured under heat and pressure, resulting in a relatively rigid substrate of foamed material with the fiberglass reinforcing material embedded therein. The resulting panel has a vinyl exterior surface backed by a relatively rigid, reinforced substrate of greater thickness than the vinyl exterior surface.

With prior art vacuum forming techniques, the exterior vinyl layer, being an essentially imperforate material, responds to the applied vacuum and is drawn to conform to the molding surface of the lower mold part. The fiberglass reinforcing mat, however, is not imperforate, and therefore, the mat does not respond to the applied vacuum so it is not drawn into tight conformity with the vinyl layer. This is especially true near portions of the molding surface that include deep draws and steep gradients, such as depressions for forming an arm rest portion of the panel. Accordingly, the reinforcing mat is not secured to the back, or B-side, of the vinyl layer and areas of the mat may not even be urged into close conformity with the vinyl layer, even when engaged by the second mold part, because the mat is embedded in the substrate material which is thicker than the mat. Thus, the reinforcing mat may float into the substrate material before the substrate material is cured, thereby creating gaps between the reinforcing mat and the vinyl layer which will fill with substrate material.

When a substrate material, such as urethane, expands during the foaming process, it gives off carbon dioxide ($CO_2$) gas. One of the functions of the fiberglass reinforcing mat, in addition to reinforcing the substrate, is to act as a mechanical barrier to prevent gas bubbles created in the substrate from reaching the vinyl layer and pushing to the A-side of the vinyl where they can create surface defects in the panel. If the fiberglass mat separates from the vinyl layer, the expanding substrate material that fills the gaps between the mat and the vinyl can create gas bubbles which can migrate unimpeded to the A-side of the panel. This is known in the industry as an "overgas condition". Accordingly, even though prior art door panel-forming techniques call for the provision of a reinforcing mat, panel surface defects can occur due to overgas conditions because there is no mechanism by which gaps between the reinforcing mat and the vinyl layer are reliably prevented.

SUMMARY OF THE INVENTION

It is an object, therefore, to overcome the deficiencies in prior art interior door panels and techniques for forming interior door panels set forth above. In accordance with the principles of the present invention, this objective is achieved by a method of making an interior panel of an automotive vehicle door, whereby the interior panel includes an exterior surface which is to face toward the interior of the automotive vehicle when the interior panel is installed on the vehicle door. The method of the present invention comprises the steps of: providing a sheet of vinyl material having a first and a second side and a reinforcing mat, placing the sheet of vinyl material in a heated condition and the reinforcing mat into a vacuum mold part having a molding surface shaped to define the exterior surface of the interior panel with the first side of the heated sheet of vinyl material engaged with the molding surface and the reinforcing mat overlying the second side of the heated sheet of vinyl material and thereafter applying a vacuum at the molding surface to draw the heated sheet of vinyl material into conformity with the molding surface to create a formed sheet of vinyl material, conforming the reinforcing mat to the second side of the formed sheet of vinyl material and effecting a securement between the reinforcing mat and the second side of the formed sheet of vinyl material, and molding material between the vacuum mold part and a cooperating opposed mold part to form an integrally molded panel having (1) the exterior surface in a shape corresponding with the shape of the molding surface of the vacuum mold part, (2) an opposed surface corresponding in shape to a molding surface of the cooperating opposed mold part, and (3) a content between the exterior and opposed surfaces which includes a relatively rigid substrate which is reinforced by the reinforcing mat and which defines the opposed surface and a layer of vinyl material presenting the exterior surface. The reinforcing mat is maintained in contact with a surface of the layer of vinyl material opposite the exterior surface during the molding step by the securement between the reinforcing mat and the second side of the formed sheet of vinyl material to substantially prevent gaps between the vinyl material and the reinforcing mat.

In accordance with the principles of the present invention, the objective is also achieved by an apparatus for forming an integrally molded interior panel of an automotive vehicle door having an exterior vinyl layer presenting an exterior surface which is to face toward the interior of the automotive vehicle when the interior panel is installed on the vehicle door and a relatively rigid substrate layer presenting an opposed surface forming a back side of the panel. The apparatus includes a sheet transport mechanism constructed and arranged to move a length of composite sheet material including a sheet of vinyl material and a reinforcing mat disposed in overlying relation with respect to the sheet of vinyl material. A heating mechanism applies heat to the length of composite sheet material, which is moved into an operative position with respect to the heating mechanism by the sheet transport mechanism, until the sheet of vinyl material is heated to a predetermined set point at which the sheet of vinyl material is softened. A vacuum assist assembly includes a vacuum assist core having a forming surface and a vacuum assist carrier. The vacuum assist carrier carries the vacuum assist core and permits the vacuum assist core to move with respect to the carrier. The length of composite sheet material is moved from the operative position with respect to the heating mechanism into an operative position with respect to the vacuum assist assembly by the sheet transport mechanism. A vacuum mold part has a molding surface shaped to define the exterior surface of the interior panel, and the forming surface of the vacuum assist core has a shape that is generally complimentary to the shape of the molding surface. The vacuum mold part is constructed and arranged to apply a vacuum at the molding surface to draw the sheet of vinyl material to the molding surface to conform the sheet of vinyl material to the molding surface. The vacuum assist core is constructed and arranged to move with respect to the vacuum assist carrier into engagement with the vacuum mold part, with the forming surface of the vacuum assist core engaging the reinforcing mat to press the reinforcing mat into contact with the sheet of vinyl material to assist the applied vacuum in conforming the sheet of vinyl material and the reinforcing mat to the shape of the molding surface and to effect a securement between the reinforcing mat and the sheet of vinyl material. A substrate material dispensing mechanism is provided to dispense a moldable substrate material onto the reinforcing mat secured to the sheet of vinyl material conformed to the molding surface of the vacuum mold part. An opposed mold part has a molding surface shaped to define the opposed surface of the interior panel. The opposed mold part operatively engages the vacuum mold part in which the substrate material dispensing mechanism has dispensed the moldable substrate material to form the opposed surface in the moldable substrate material to thus form the interior panel between the respective molding surfaces of the vacuum mold part and the opposed mold part.

In accordance with the principles of the present invention, the objective is also achieved by an interior panel for an automotive vehicle door, the interior panel including an exterior surface which is to face toward the interior of the automotive vehicle when the interior panel is installed on the vehicle door. The interior panel comprises a vinyl exterior layer having an outer surface defining the exterior surface of the interior panel. A reinforcing mat conforms to an inner surface of the vinyl exterior layer opposite the outer surface and is secured to the inner surface of the vinyl exterior layer to substantially prevent separation of the reinforcing mat from the vinyl exterior layer. A substrate layer is reinforced by the reinforcing mat and is formed onto the inner surface of the vinyl exterior layer opposite the exterior surface.

Other objects, features, and characteristics of the present invention, as well as the methods of operation and functions of the related elements of structures and the combination of parts, will become more apparent upon consideration of the following description and the appended claims with reference to the accompanying drawings, all of which form a part of this specification, wherein like reference numerals designate corresponding parts in the various figures.

DETAILED DESCRIPTION OF THE PRESENTLY PREFERRED EXEMPLARY EMBODIMENT

For convenience in the following description, various directional or other spatial references are made in regard to the orientation of the structure(s) as illustrated in the drawings. It should be understood, however, that such references, including without limitation, upper, lower, top, bottom, left, right, horizontal, vertical, lateral, or longitudinal, are made for purposes of convenience and should not be construed to be limiting on the invention described herein.

Figure 1:
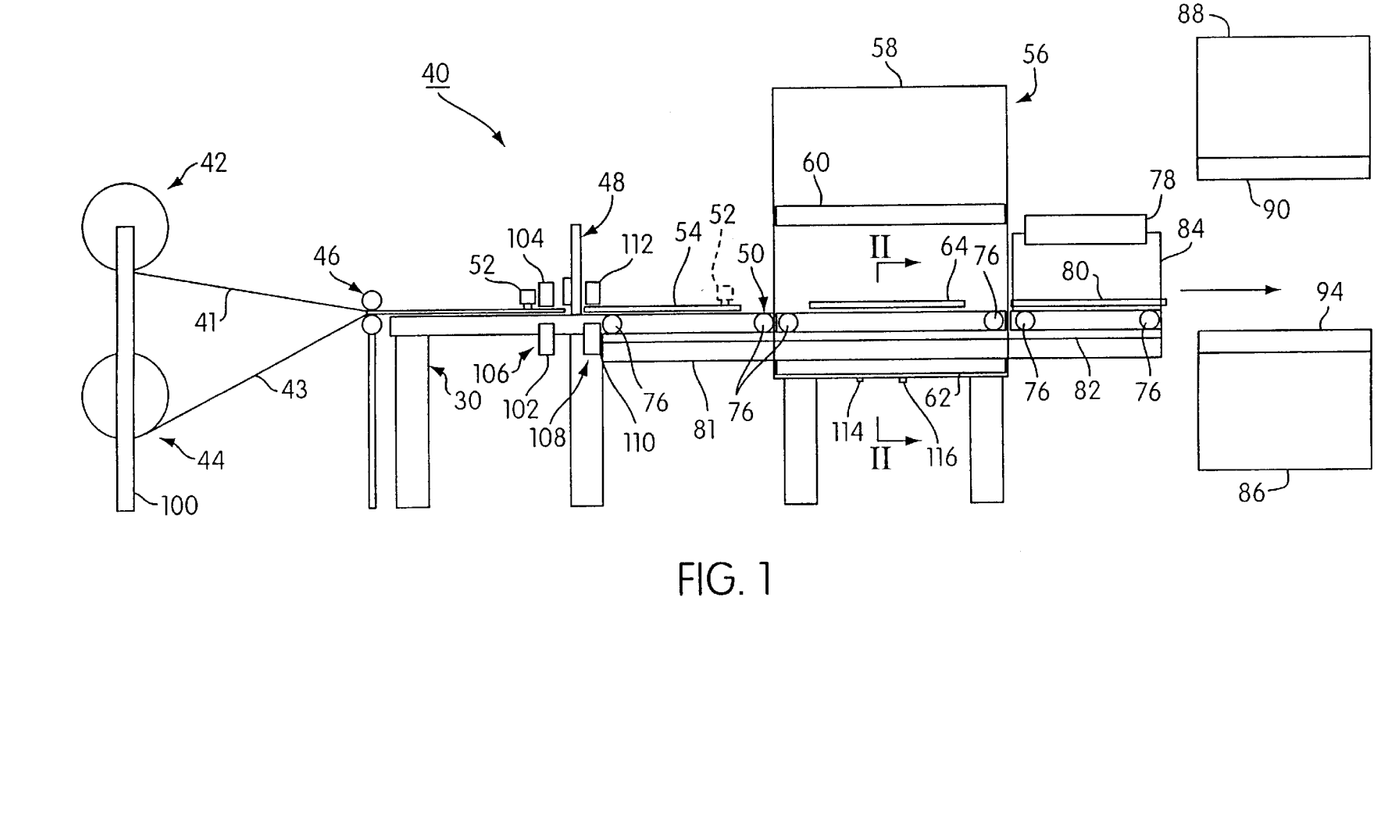
FIG. 1 is a schematic view of a material preparation and shuttling system embodying aspects of the present invention.

A material preparation and shuttling system used in conjunction with carrying out the method of the present invention is designated generally by reference number 40 in FIG. 1. The system is preferably a delivery system available from Konal of Blenheim, Canada. The method is best described progressing from left to right in the illustrated embodiment.

A roll 44 of expanded vinyl laminate is operatively placed on a mandrel structure 100 with the class A side of the vinyl facing outwardly within the roll 44 or downwardly in the portion 43 pulled from the roll 44. The vinyl laminate comprises a layer of smooth vinyl having a thickness of, for example, 0.5 millimeters bonded with a layer of expanded vinyl having a thickness of, for example, 1.3 millimeters, for a total laminate thickness of 1.8 millimeters. The smooth vinyl layer presents the class A surface of the laminate on the outer surface thereof, and the expanded vinyl layer provides a semi-soft tactility to the laminate.

A roll 42 of reinforcing mat material is operatively loaded on the mandrel 100, preferably above the roll 44 of vinyl, so that a sheet of mat material 41 can be pulled from the roll 44. The mat material 41 is preferably a three-ply interwoven mat, typically 1 to 1.25 mm in thickness (¾ ounce per square foot). It is presently preferred to employ a fiberglass material as the reinforcing mat material.

The mat material 41 and vinyl 43 are pulled from rolls 42 and 44, respectively, and are preferably passed through nip rollers 46 and then to support table 30 as a two-layer loose composite. A clamp and shuttle device 52 grasps the vinyl/mat composite and pulls it to the right to the position where the clamp and shuttle device 52 is shown in phantom at a sufficient distance beyond a cutting device 48.

The mat 41 and vinyl 43 are preferably bonded to one another at a number of discrete positions along the outer peripheral edges thereof. The two layers are preferably "tacked" to one another by heat stakes 106 and 108. Heat stake 106 includes a cowl rod heating source 102 and an anvil 104. Similarly, heat stake 108 includes a cowl rod heating source 110 and an anvil 112. With the vinyl-mat composite disposed between the heat source and anvil, the heat source is brought into engagement with the anvil. The heat source, which preferably reaches a temperature of 350–400 deg. F, causes the vinyl to soften locally and bond with the mat by permitting the mat to become locally embedded in the vinyl. Heat stakes 106 and 108 and two similarly positioned heat stakes (not shown) disposed on the opposite side of table 30 are used to tack four corners of a cut piece of vinyl-mat composite. Forward heat stake 106, and the opposite, not shown heat stake tack two corners of the composite before the grip and shuttle device 52 pulls the composite past the cutting device 48. After the grip and shuttle device grasps the composite and pulls it past the cutter 48, heat stake 108 and the opposite, not shown, heat stake tack two different corners of the composite.

Alternatively, pre-applied strips of a suitable pressure sensitive adhesive may be provided on the mat material 41. Such strips are preferably formed at a distance from the edges of the mat 41, preferably about 1 inch. The mat material 41 would be oriented on the roll 42 so that the adhesive strips face outwardly on the roll, that is, downwardly on the section 41 pulled from the roll 42. The strips come into contact with the vinyl, and, due to the pressure applied by the nip rollers 46, cause a bond between the mat material and the vinyl. While it is preferred that strips be pre-applied, it is within the contemplation of the present invention that strips of adhesive could be applied to the mat material 41 as it is unrolled from the roll 42.

The vinyl-mat composite 54 is pulled past the cutting device 48 by the grip and shuttle device 52. After the composite 54 is pulled past the cutting device 48, the grip shuttle device 52 releases the composite and cycles back to its original position to grasp and shuttle a subsequent composite of vinyl and mat material at the appropriate time.

Cutting device 48 cuts the composite 54 at predefined intervals so as to form the cut vinyl-mat composite sheet. The cutting device 48 is preferably a single steel rule die blade operatively driven by a pneumatic actuator, although any suitable cutting mechanism, such as a rotary cutting blade mounted on a unit which translates across the width of the composite 54, may be used.

Figure 2:
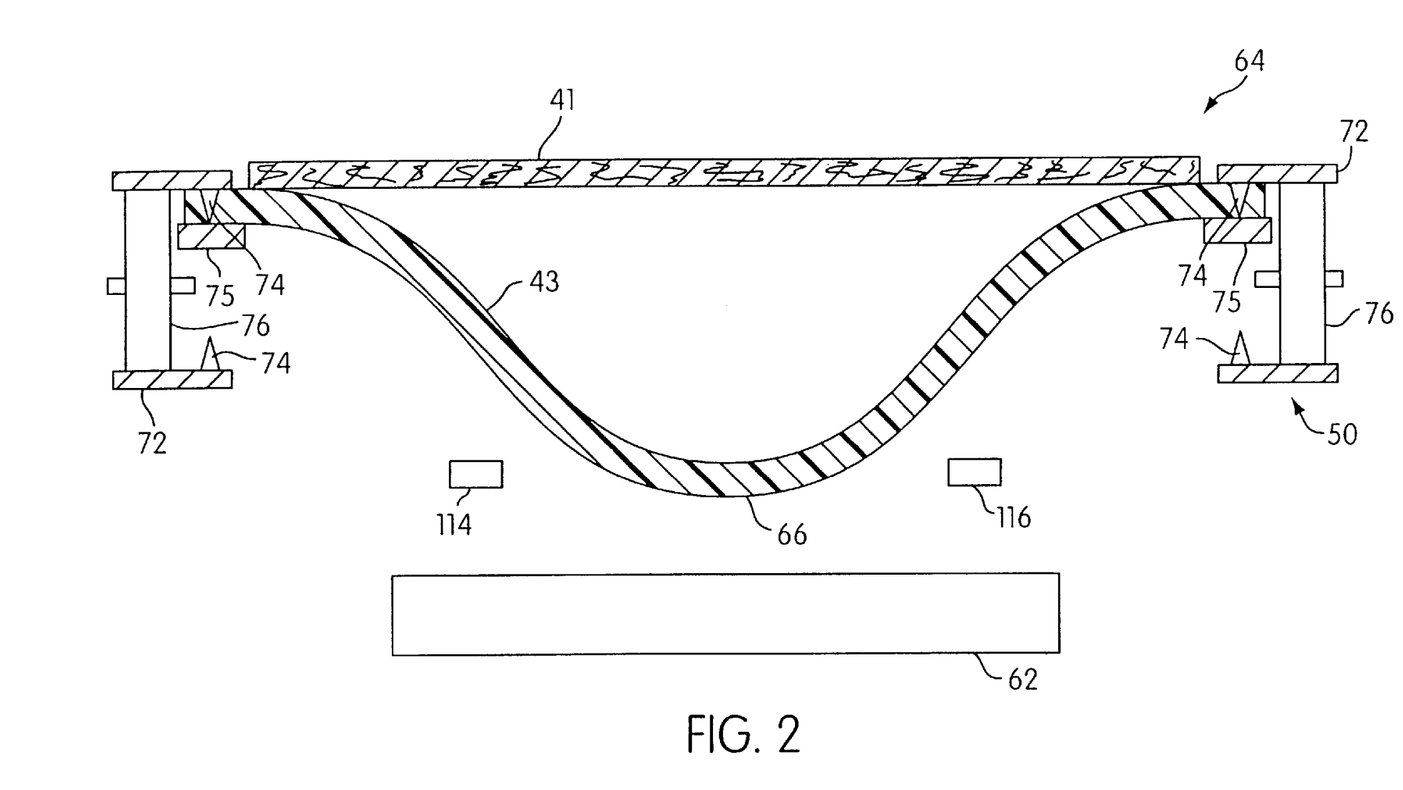
FIG. 2 is a cross-sectional view of a portion of the material preparation and shuttling system taken along the line II—II in FIG. 1.

After the composite 54 is cut by the cutting device 48, the composite is moved up into engagement with pins 74 of a pin-chain conveyer system 50 traveling on rollers 76. (See FIG. 2) Pins 74 preferably point inwardly relative to the conveyer system 50 from a continuous chain loop 72 and the composite 54 is engaged with the upper row of downwardly pointing pins. Guides 75, preferably comprising aluminum strips, are pivotally supported on the table 30 and pivot up to hold the composite sheet in engagement with the upper pins. As shown in FIG. 2, the width of the mat material 41 is preferably less than the width of the vinyl so that the pins 74 only pierce the vinyl layer of the composite sheet.

After cutting, the cut vinyl-mat composite 54 is next transported by the pin-chain conveyor system 50 into the heating unit 56. Heating unit 56 preferably comprises a heating unit housing 58 having openings on opposite sides thereof for passage of the conveyor system 50 and the vinyl-mat composite sheet therethrough. Heating unit 56 further includes upper heating elements 60 and lower heating elements 62 housed within the heating unit housing 58. Heating units 60 and 62 are preferably infrared heaters. In general, convection heating elements are not preferred because convection units are too slow in heating the composite to the desired temperature and, in general, create too much air movement which can disrupt the lightweight mat material which is only minimally tacked to the vinyl material.

The conveyor system 50 transports the cut composite, now designated by reference number 64 to indicate a composite sheet located at a different station along the shuttle and delivery system 40, into the heating unit 56 and pauses while the composite 64 is heated by the upper and lower heating elements 60, 62. The composite 64 is heated until a set point for the vinyl is reached (preferably 280±/+15 deg. F). Because the reinforcing mat material acts as a thermal insulator, it is necessary to apply more heat to the upper side of the composite 64 than to the lower side of the composite 64 to achieve consistent heating through the thickness of the vinyl. Therefore, it is preferable the heating elements 60 and 62 be independently controllable.

As shown in FIG. 2, the vinyl sheet 43 is only supported at its opposite edges and is therefor permitted to sag as it is heated. The vinyl-mat composite 64 is heated until the vinyl 43 reaches a set point, or until the heat-induced sag 66 of the vinyl 43 activates an optical sensor comprising an emitter 114 and detector 116 disposed on opposite sides of the longitudinal centerline of the conveyor system 50. The emitter 114 and detector 116 are preferably oriented diagonally with respect to the longitudinal centerline of the conveyor system 50. As can be appreciated from FIG. 2, when the vinyl 43 sags to a position 66 between the emitter 114 and detector 116, a beam from the emitter is broken by the sagged vinyl 43. The emitter 114 and detector 116 are positioned so as to be activated when an amount of sag, indicating sufficient softening of the vinyl 43, is reached. It is presently considered that for a piece of vinyl material of approximately 44 inches in width, a sag of approximately 8 inches indicates sufficient softening and heating of the vinyl.

If adhesive strips are employed to temporarily bond the vinyl to the mat, then it is preferred that the applied heat not be directed at the adhesive strips, as the heat can adversely affect adhesion of the reinforcing mat material to the vinyl.

Activation of the optical sensor caused by the breaking of the emitter's beam by the sag 66 of the vinyl of the cut composite 64 activates the conveyor 50 to transport the heated cut composite 64 into a vacuum assist carrier 84, which operatively supports a vacuum assist core 78. The heated cut composite, now designated by reference number 80, having been transported from the heating unit 56 into the vacuum assist carrier 84 is supported within the vacuum assist carrier 84. The vacuum assist core 78 is essentially a mock core of the thermal-forming tool, preferably formed of machined aluminum. The function of the vacuum assist core 78 is described below.

The entire conveyor system 50, the heating unit 56, and the vacuum assist carrier 84 are preferably supported on a linear rail shuttle system comprising an extendible rail assembly 82 and a support rail assembly 81. The conveyor system 50, the heating unit 56, and the vacuum assist carrier 84 are supported on the extendible rail assembly 82. The extendible rail assembly 82 is slidably or rollably mounted on support rail assembly 81 so that the extendible rail assembly 82 and the conveyor system 50, the heating unit 56, and the vacuum assist carrier 84 supported thereon can translate with respect to the support rail assembly 81. Extendible rail assembly 82 is preferably translated by means of a pneumatic actuator.

When the heated cut composite 80 is properly positioned in the vacuum assist carrier 84, a position switch is triggered, and the conveyor system 50, the heating unit 56, and the vacuum assist carrier 84 are translated to the left with the extendible rail assembly 82 relative to the table 30 and support rail assembly 81.

Figure 3:
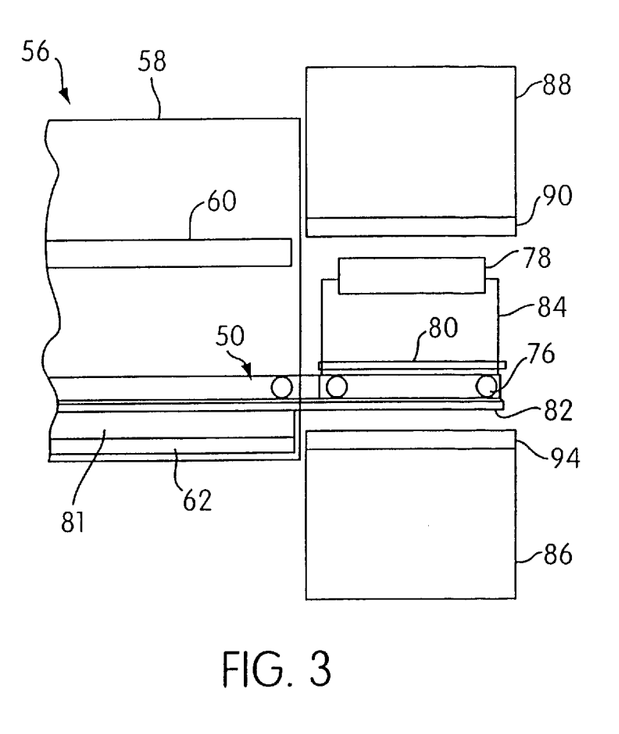
FIG. 3 is a partial schematic view of a linear rail system, a heating unit, a conveyor system, a vacuum assist unit and associated carrier, a thermal-forming tool core and associated carrier, and a thermal-forming tool cavity and associated carrier with the vacuum assist and its carrier extended into alignment with the thermal-forming tool cavity.

As shown in FIG. 3, the system translates until the vacuum assist carrier 84 is in a position above a cavity half 94 and associated carrier 86 of a thermal-forming tool which is disposed at the end of the material preparation and shuttling system 40. Cavity half 94 constitutes a first mold part and has a molding surface that defines and forms the shape of the exterior surface of the door panel. The thermal-forming tool also includes a core member 90 having an associated carrier 88. The core member 90 constitutes a second mold part having a molding surface that defines the back surface of the panel. During the positioning of the vacuum assist carrier 84 over the cavity half 94, the thermal-forming tool core 90 and its carrier 88 are positioned so as not to obstruct the free movement of the vacuum assist carrier 84. As can be appreciated from FIG. 3, with the vacuum assist carrier 84 positioned above the cavity half 94, the heated cut composite 80 is also positioned above the cavity half 94 of the thermal-forming tool.

Figure 4:
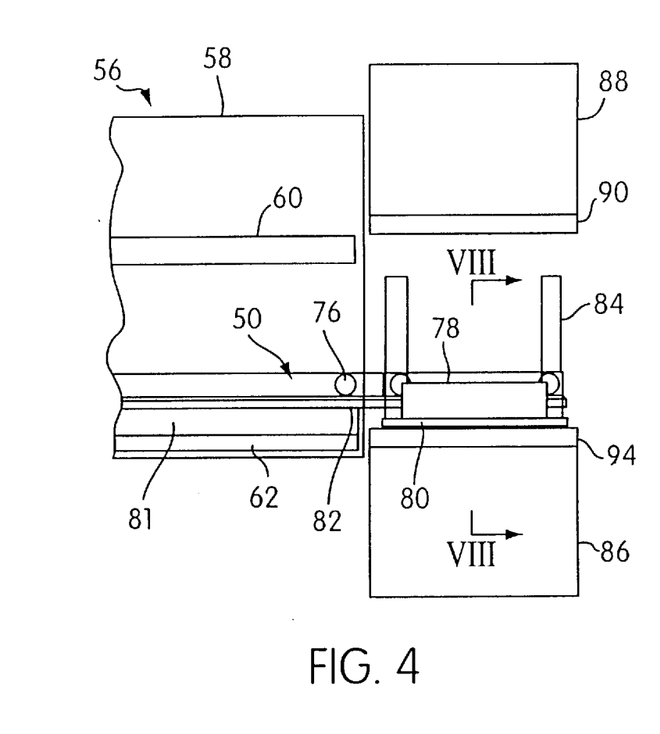
FIG. 4 is a partial schematic view of the linear rail system, the heating unit, the conveyor system, the vacuum assist and associated carrier, the thermal-forming tool core and associated carrier, and the thermal-forming tool cavity and associated carrier with the vacuum assist aligned with the thermal-forming tool cavity and lowered into engagement with the thermal-forming tool cavity.

As shown in FIG. 4, the vacuum assist core 78 is vertically movable relative to the vacuum assist carrier 84. With the vacuum assist carrier 84 and the heated composite 80 positioned above the cavity half 94, the vacuum assist core 78 moves downwardly on the carrier 84 so as to cooperatively engage the heated cut composite 80 and the cavity half 94 to pre-form the vinyl and mat to the shape of the molding surface of the cavity half 84. In addition, a vacuum is simultaneously applied to the cavity half so as to draw the heated composite 80 into the cavity half 94. To ensure that the vinyl remains sufficiently soft, it is preferable that the carrier 84 be moved into alignment with the cavity half 94 and the vacuum assist core 78 engage the composite 80 and cavity half 94 within 3–5 seconds after the heated composite 80 leaves the heating unit 56.

Figure 8:
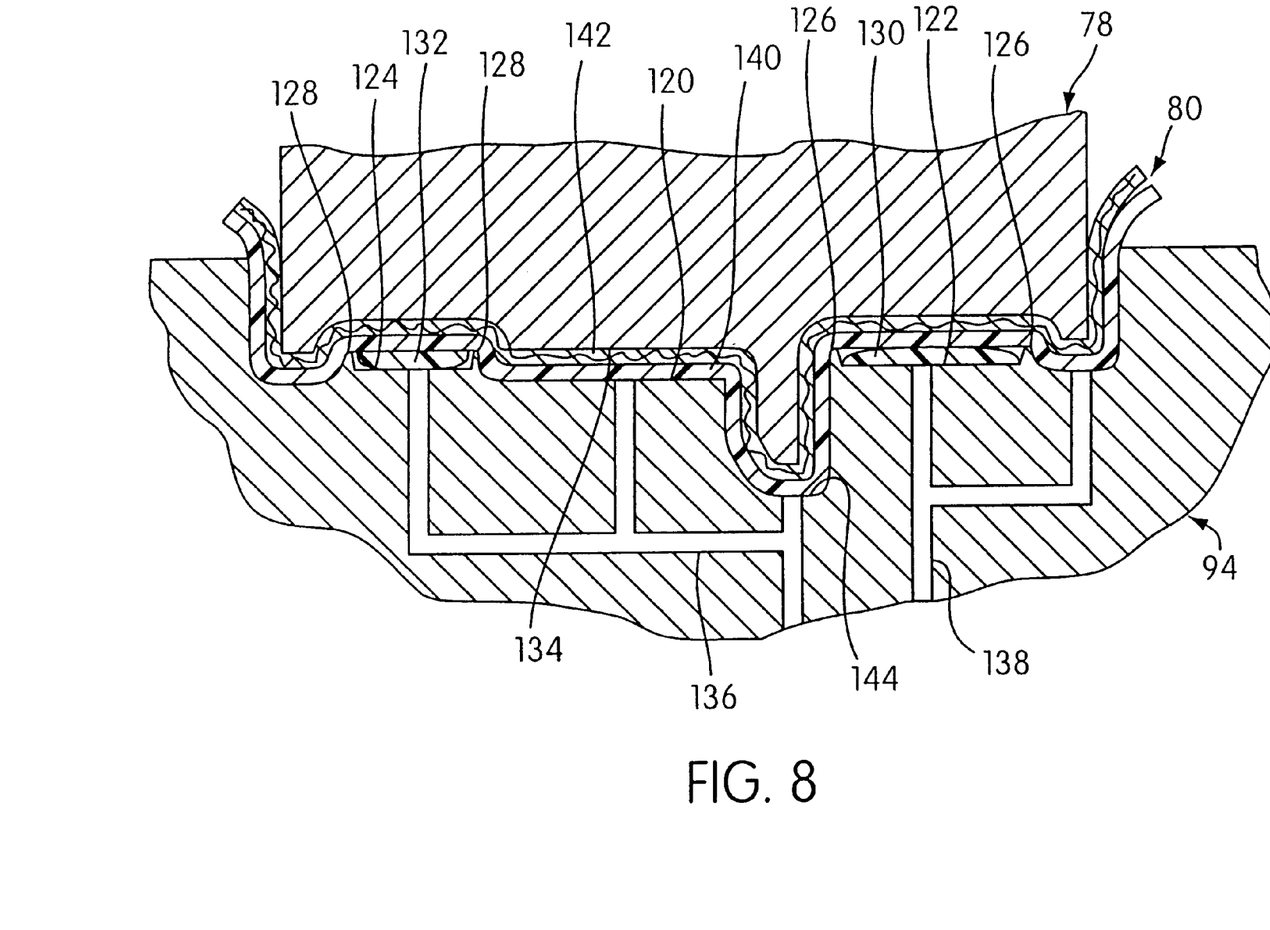
FIG. 8 is a partial cross-section of a thermal forming tool cavity and vacuum assist core according to the present invention, taken along the line XIII—XIII in FIG. 4.

As shown in FIG. 8, cavity half 94 will have a mold surface 120 which forms the exterior portion of the door panel when the panel, mounted in a vehicle door, faces the interior of the vehicle passenger compartment.

The vacuum assist core 78, having a forming surface 134 that is complimentary to the molding surface 120 of the cavity half 94, assists the vacuum, which may be applied through conduits, such as illustrated conduit systems 136 and 138 connected to a vacuum source (not shown), in pre-forming the heated vinyl 140 and the associated mat material 142 of the heated composite 80 into a laminate having the shape of the molding surface 120 of the cavity half 94. The vacuum assist core 78 engages the composite sheet 80 and presses the mat 142 into contact with the vinyl 140 and presses both the mat 142 and the vinyl 140 into engagement with the molding surface 120. Thus, the vacuum assist core 78 assists the applied vacuum in causing the heated vinyl 140 and mat 142 of the composite 80 to conform to the shape of the molding surface 120 of the cavity half 94, especially where the molding surface 120 includes deep draws 144 and drafts where a vacuum alone may cause the vinyl to stretch.

Figure 9:
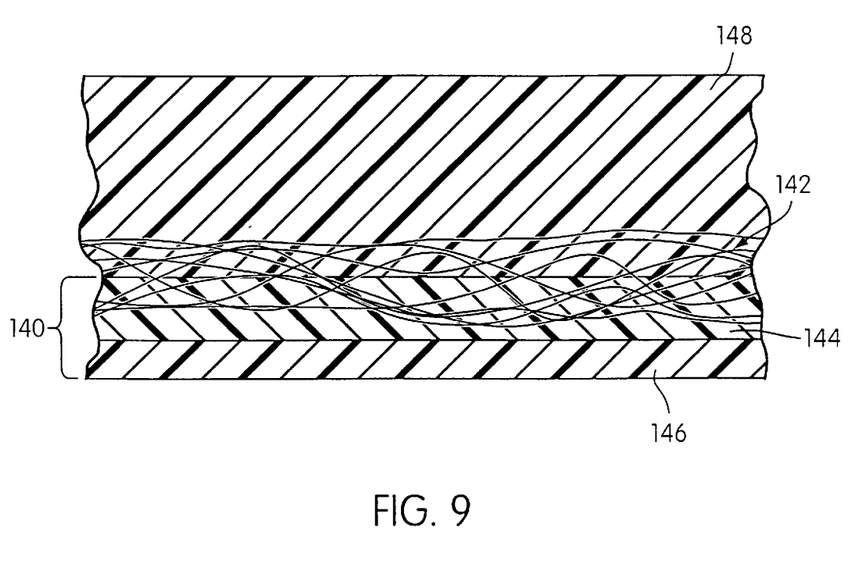
FIG. 9 is an enlarged cross-section of a portion of an interior panel formed in accordance with present invention.

The vacuum assist core 78 is preferably engaged with the cavity half 94 for at least twelve seconds with very little pressure applied by the vacuum assist core 78 to the cavity half 94 and the composite 80 sandwiched therebetween. The period of vacuum assist engagement should be long enough to allow the vinyl to cool sufficiently so that it can maintain its form. A proximity switch (not shown) is used to indicate when the vacuum assist core 78 has been lowered into the desired position. As shown in FIG. 9, it is desirable that the fibers of the mat material 142 become partially embedded into the softened B-side expanded vinyl layer 144 of the vinyl laminate 140 so as to form a securement, or bond, between the vinyl laminate 144 and the mat 142 in the form of a fixed interface between the two materials. It is undesirable, however, that the mat "read through" the vinyl laminate 140 to the class A surface layer 146, lest the class A surface will be marred. Accordingly, it is desirable, at locations of deep draws and hard edges in the molding surface 120 of the cavity half 94, to provide areas of relief of typically 1.5 mm in the vacuum assist. Preferably, about one-half of the thickness of the mat 142 is embedded into the expanded vinyl layer 144 of the laminate 140.

While the vacuum assist core 78 is moved downwardly to engage the cavity half 94 of the thermal-forming tool, the composite 80 is released from the pin chain conveyor 50. Following the pre-forming step, the vacuum assist core 78 is raised on its carrier 84 out of engagement with the cavity half 94 of the thermal-forming tool to the position shown in FIG. 3. A vinyl-mat laminate pre-form, now designated by reference number 83, is left behind in the cavity half 94 of the thermal-forming tool, and the carrier 84 and vacuum assist core 78 are retracted by the extendible rail assembly 82, thus allowing the thermal forming tool to shuttle to a next station in the process.

Mold surface 120 may include bolster-receiving sections 122 and/or 124. Bolster-receiving section 122 is surrounded by a peripheral lip 126, and, similarly, bolster-receiving section 124 is surrounded by a peripheral lip 128. The bolster-receiving sections 122, 124 are designed to receive pre-cut pieces of fabric or carpet, generally indicated by reference numbers 130 and 132, backed with a heat sensitive adhesive, such as a polyurethane film. The pre-cut fabric or carpet is placed in the bolster-receiving sections 122, 124 of the cavity half 94 prior to pre-forming the vinyl-mat composite into a vinyl-mat laminate. The heat of the vinyl causes the heat sensitive adhesive to become tacky and thus causes the carpet or fabric to adhere to the outer surface of the vinyl as the vinyl is being pre-formed. This process of adhering precut fabric or carpet to the exterior of the panel by employing heat sensitive adhesive that is activated by the heat of the vinyl is described in more detail in U.S. Pat. No. 5,571,355, the disclosure of which is hereby incorporated by reference.

With the vacuum assist carrier 84, heating unit 56, and conveyor system 50 retracted back to the positions shown in FIG. 1, a new cycle of pulling material, cutting a composite sheet, heating the composite sheet, and pre-forming the heated composite sheet into a vinyl-mat laminate may begin. Alternatively, a material preparation and shuttling system could be configured to continuously pull, cut, heat, and pre-form a supply of interior panel pre-forms.

Figure 5:
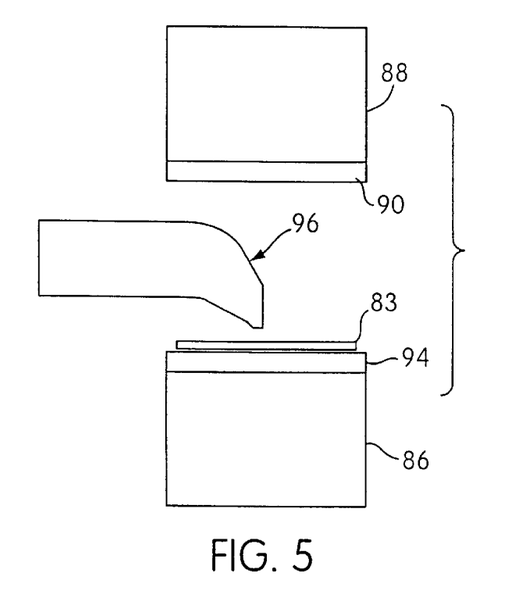
FIG. 5 is a schematic view of the thermal-forming tool core and associated carrier, the thermal-forming tool cavity and associated carrier, and a filler foam pouring device positioned to pour a filler foam into a pre-formed vinyl laminate disposed in the thermal-forming tool cavity.

At the next station, as shown in FIG. 5, a two-component, pre-mixed urethane foam, typically comprised of isocyanate and polyol, is open-poured into the vinyl-mat laminate pre-form 83 operatively disposed within the lower cavity 94, preferably by a robotic pouring mechanism 96.

Figure 6:
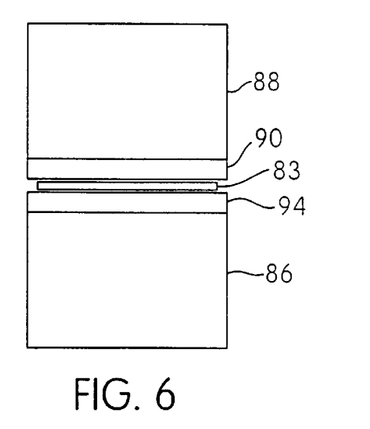
FIG. 6 is a schematic view of the thermal-forming tool core and associated carrier and the thermal-forming tool cavity and associated carrier with the core disposed in forming engagement with the cavity.

As shown in FIG. 6, with the laminate pre-form 83 filled with foamable material, and with the pouring mechanism 96 retracted out of the way, or the carrier 86 moved away from the pouring mechanism 96, the cavity half 94 and core 90 of the thermal-forming tool are brought into operative engagement with one another by their respective carriers 88, 86. Core 90 has a molding surface that defines the back, or B-side, surface of the finished door panel. Core 90 and cavity half 94 cooperate with each other to mold the foamed material to the shape of the vinyl-mat laminate pre-form and to form a finished door panel. With the mat 142 firmly secured to the vinyl laminate 140 by virtue of being partially embedded therein, the mat 142 is unlikely to separate from the vinyl laminate 140. Thus, gaps between the mat 142 and the vinyl 140 are prevented, and overgas conditions, as described in the "Background" section above, are avoided.

Engagement of the core 90 with the cavity half 94 activates a locking mechanism positively closing the thermal-forming tool and further activating a pressurizing system which builds up the required load between the core 90 and cavity half 94, which is preferably 50 tons. The core 90 and the cavity half 94 are preferably interengaged for 90 seconds with the core maintained at a temperature of 165±5° F. and the cavity half 94 maintained at a temperature of 145±100° F. to cure the urethane into a relatively rigid substrate. As shown in FIG. 9, because only half the mat layer 142 is embedded in the expanded vinyl layer 144 of the vinyl laminate 140 during the pre-forming step, the other half of the mat layer 142 become embedded into the substrate layer 148.

Figure 7:
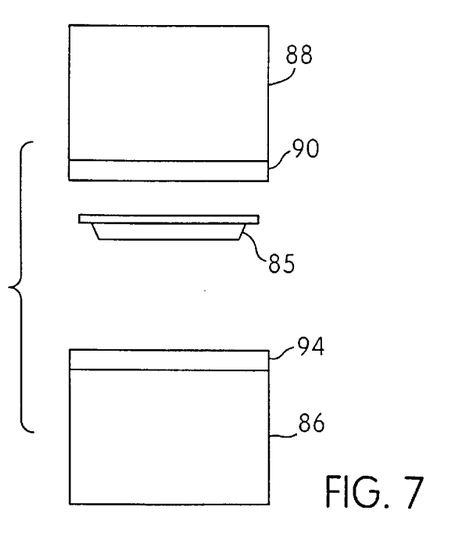
FIG. 7 is a schematic view of the thermal-forming tool core and associated carrier, the thermal-forming tool cavity and associated carrier, and a vehicle interior panel with the core disengaged from the cavity and the interior panel separated from the cavity.

As shown in FIG. 7, after the foam has cured into a relatively rigid substrate, the tool is opened and the core 90 and cavity half 94 are separated from one another and the completed interior door panel 85 is removed from the cavity half 94. The interior door panel 85 is now ready for final finishing procedures, such as cleaning and trimming of excess vinyl around the periphery thereof.

While the invention has been described in connection with what is presently considered to be the most practical and preferred embodiment, it is to be understood that the invention is not to be limited to the disclosed embodiment, but, on the contrary, is intended to cover various modifications and equivalent arrangements included within the scope and spirit of the appended claims. Thus, it is to be understood that variations in the particularly described method, apparatus, and article of manufacture of the present invention can be made without departing from the novel aspects of this invention as defined in the claims.

What is claimed is:

1. A method of making an interior panel of an automotive vehicle door, the interior panel including an exterior surface which is to face toward the interior of the automotive vehicle when the interior panel is installed on the vehicle door, said method comprising the steps of:

providing a composite sheet comprising a vinyl material and a reinforcing mat, said vinyl material and said reinforcing mat being tacked together at positions along an outer peripheral edge thereof;

heating the composite sheet until the vinyl material sags relative to the reinforcing mat a predetermined amount;

forming the composite sheet into a pre-form by placing the composite sheet while in the heated condition into a mold cavity having a molding surface shaped to define the exterior surface of the interior panel and thereafter applying a vacuum at the molding surface to draw the vinyl material into conformity with the molding surface and conforming the reinforcing mat to the vinyl material for effecting a bond between the reinforcing mat and vinyl material; and pouring foam into the pre-form and conforming the foam to the pre-form until the foam has sufficiently cured.

2. The method of claim 1, wherein said step of conforming the reinforcing mat:

engaging the mold cavity with a vacuum assist core while the vinyl material is still in the heated condition, the vacuum assist core having a forming surface with a shape generally complimentary to the shape of the molding surface of the mold cavity with the forming surface engaging the reinforcing mat;

pressing the reinforcing mat with the vacuum assist core into engagement with the heated vinyl material to assist the applied vacuum in conforming the heated vinyl material to the shape of the molding surface of the mold cavity and to conform the reinforcing mat to the shape of the heated vinyl material; and maintaining the engagement of the vacuum assist core with the reinforcing mat and the heated vinyl material disposed within the mold cavity for a period of time of sufficient duration to permit the vinyl material to cool sufficiently so that the vinyl material can maintain its shape in conformity with the molding surface of the mold cavity and to effect the bond between the reinforcing mat and the vinyl material.

3. The method of claim 1, wherein the vinyl material comprises a laminate having a layer of relatively smooth vinyl presenting the exterior surface and a layer of expanded vinyl presenting an opposed side of the vinyl material.

4. The method of claim 1, wherein the reinforcing mat comprises interengaged fiberglass fibers.

5. The method of claim 1, wherein the reinforcing mat comprises a sheet of interengaged fibers and wherein the bond between the reinforcing mat and the vinyl material is effected by embedding a portion of the fibers of the reinforcing mat into the heated vinyl material.

6. The method of claim 1, wherein the vinyl material and the reinforcing mat are provided from respective continuous rolls of vinyl sheet material and reinforcing mat sheet material.

7. The method of claim 6, wherein said step of providing the composite sheet comprises the steps of:

pulling lengths of vinyl sheet material and reinforcing mat sheet material from the respective continuous rolls of vinyl sheet material and reinforcing mat sheet material, wherein the respective continuous rolls of vinyl sheet material and reinforcing mat sheet material are arranged so that the pulled lengths of vinyl sheet material and reinforcing mat sheet material are in an overlying relation with respect to each other;

attaching portions of the length of vinyl sheet material to portions of the length of reinforcing mat material along opposed edges thereof; and cutting a predetermined length of vinyl sheet material and reinforcing mat sheet material from the lengths of vinyl sheet material and reinforcing mat sheet material pulled from the respective continuous rolls of vinyl sheet material and reinforcing mat sheet material.

8. The method of claim 1, wherein the composite sheet is heated by placing the composite sheet in a heater mechanism comprising a first infrared heating device disposed on one side of the composite sheet and a second infrared heating device disposed on an opposite side of the composite sheet.

9. The method of claim 1, wherein the vinyl material is heated to a temperature of 265 to 295° F.

10. The method of claim 1, wherein the vinyl material is secured on opposite edges thereof during said heating step and a portion of the vinyl material between the secured opposite edges is permitted to sag relative to the reinforcing mat as the vinyl material softens while it is heated, and wherein the amount of sag of the vinyl material is monitored to determine when the sheet of vinyl material has sagged the predetermined amount.

11. The method of claim 2, wherein the engagement of the vacuum assist core with the reinforcing mat and the vinyl material disposed within the mold cavity is maintained for at least twelve seconds.

12. The method of claim 1, wherein the step of conforming the foam to the pre-form until the foam has sufficiently cured comprises:

engaging the mold cavity with a cooperating opposed mold part after pouring the foam into the pre-form, the cooperating opposed mold part having a molding surface shaped to define an opposed surface of the interior panel; and curing the foam by applying heat and pressure to the foam and the pre-form between the respective molding surfaces of the mold cavity and the cooperating opposed mold part.

13. The method of claim 12, wherein said foam comprises a pre-mixed urethane comprising isocyanate and polyol.

14. The method of claim 12, wherein the cooperating mold part is maintained at a temperature within the range of 160–170° F., the mold cavity is maintained at a temperature within the range of 135–155° F., and the heat and pressure are applied for 90 seconds during said curing step.

15. The method of claim 1, further comprising the step of placing one or more pre-cut bolsters into one or more designated positions on the molding surface of the mold cavity prior to placing the composite sheet in the heated condition into the mold cavity, each pre-cut bolster having a fabric or carpet outer portion which presents a non-vinyl portion of the exterior surface of the interior panel and a heat-sensitive adhesive backing which is activated by the heat of the heated vinyl material placed into the mold cavity to adhere the bolster to the vinyl material.

\* \* \* \* \*